United States Patent
Bartyan et al.

[11] 3,904,085
[45] Sept. 9, 1975

[54] MACHINE FOR PREPARING AND DISPENSING ICE-CREAM WITH FLAVOR SELECTION

[76] Inventors: Ladislao Vittorio Bartyan, Viale Coni Zugna 7, Milan, Italy, 20144; Alberto Cipelletti, Via Polenghi 5, San Fiorano, Italy, 20070

[22] Filed: May 17, 1973

[21] Appl. No.: 361,323

[30] Foreign Application Priority Data
May 26, 1972 Italy.................................. 24963/72

[52] U.S. Cl.................. 222/131; 62/201; 222/132; 222/146 C
[51] Int. Cl.² ........................................ B67D 5/62
[58] Field of Search........ 222/132, 134, 135, 146 C, 222/144.5, 130, 131; 62/185, 139, 201, 135, 204, 524

[56] References Cited
UNITED STATES PATENTS

| | | | |
|---|---|---|---|
| 1,642,623 | 9/1927 | Niven............................ | 222/144.5 X |
| 1,794,387 | 3/1931 | Mojonnier.................... | 222/146 C X |
| 1,838,872 | 12/1931 | Schwinn............................. | 62/201 X |
| 2,736,480 | 2/1956 | Anderson......................... | 222/132 X |
| 3,081,909 | 3/1963 | Hooker............................. | 222/135 X |
| 3,681,937 | 8/1972 | Barden............................. | 62/524 X |

*Primary Examiner*—Robert B. Reeves
*Assistant Examiner*—Joseph J. Rolla
*Attorney, Agent, or Firm*—Michael S. Striker

[57] ABSTRACT

A multi-unit machine for preparing and dispensing ice-cream wherein each unit comprises a freezing and processing cylinder and a supply container for preparing and dispensing ice-cream, the outlet means of the several units being connected to a valve and selector device adapted for dispensing individual and mixed products prepare by any individual unit or formed by a mixture of products prepared by adjacent units, the cylinder and the container of the unit designed to prepare and dispense the most requested flavor being substantially greater than that of the adjacent units, and all supply containers being enclosed into a cooled liquid mass acting as a heat sink for the mixes stored into said containers.

3 Claims, 3 Drawing Figures

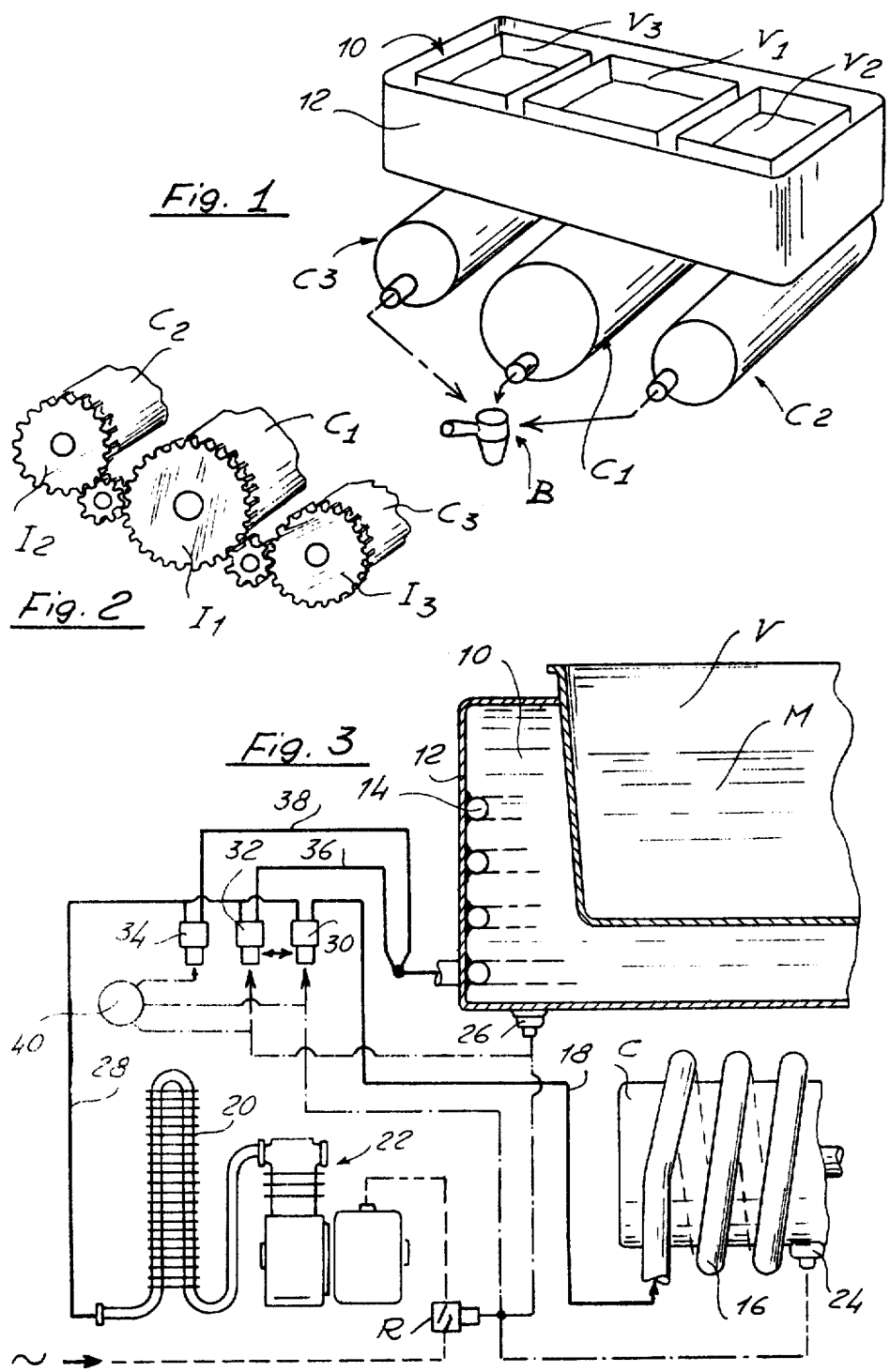

MACHINE FOR PREPARING AND DISPENSING ICE-CREAM WITH FLAVOR SELECTION

BACKGROUND OF THE INVENTION

A. The Field of the Invention

This invention relates in general to dispensing freezers, customarily used to freeze and dispense ice-cream and other applicable soft-frozen products. More particularly this invention is concerned with a machine of the kind comprising a plurality of ice-cream preparing units, each unit including a freezing cylinder with means for introducing thereto charges of the mix which is to be frozen, presenting a valved outlet at one end through which the frozen product is dispensed, and having a motor driven dasher within the cylinder.

B. The prior Art

In much multiple machines, the various cylinders, generally three or more freezing cylinders, located side-by-side and individually arranged below an individual container or vat adapted to contain a supply of the mix to be progressively transferred, in general by gravity, to the respective cylinder. This arrangement is provided for preparing and dispensing soft-frozen edible products having different flavors, determined by the mix composition charged in the respective supply container. More generally, the valved outlets associated with the various cylinders are connected, through suitably arranged duct means, so that single flavored ice-cream can be selectively dispensed from each cylinder as well as mixed products can also be dispensed by mixing frozen products concurrently issued from adjacent cylinders.

Typically, a multiple machine of the kind above described comprises an odd number of units, such as three or five. Considering now, for simplicity, the simplest three-units multiple machine, the dispensing outlet valve arrangement is such that the flavored product of the centrally located unit, is a conventional side-by-side assembly, can be selectively mixed with the one or the other of the products prepared in each sidewardly located unit to dispense a multiflavored edible product, as well as it can be individually dispensed.

Of course, the flavors (and also the colors) of the various mixes to be prepared and time-to-time charged into the several supply containers are purely matter of taste and of public demand. Further not all possible combinations of flavors lead to an agreeable product. Therefore a skilled operator charges into the container of the centrally located unit the flavor which is most adapted to be mixed with each individual flavor charged in either adjacent unit. In general the flavor of the mix and then of the ice-cream charged into and dispensed from the central unit, additionally to being adapted to form mixed edible products most desired by public, is also that which is mostly in demand, when individually dispensed.

Therefore, in the general and most common service of a suitably conducted and operated multiple machine of the kind referred to above, the rate of dispensing and therefore of production of the center unit, in which the ice-cream possessing the most desirable flavor is prepared and dispensed, has been found to be, from a statical point of view, remarkably higher than that of the adjacent units. Consequently, the centrally located supply container must more frequently charged.

The Applicants have found that these actual service conditions lead to certain problems which had not heretofore recognized and considered. These problems deal with the proper operation of the various units, the uniformity of processing of the ice-creams of differing flavors, the proper maintaining of suitable quantities of each mix in condition for final dispensing, and the proper and prompt refrigeration of the mixes in the respective storage or supply chambers and containers, at the required low but not freezing temperature, necessary to prevent biochemical impairment of the essentially milk-based mixtures.

It is therefore the principal object of the invention to provide a new and advantageous multiple machine of the general type above considered, and by which the above and other problems are solved and the objection to which the conventional machines are subject can be completely removed.

BRIEF SUMMARY OF THE INVENTION

According to the invention, there is provided a machine including a plurality of ice-cream preparing and dispensing units which individually comprise a freezing cylinder having a mixer and impeller means therein and an outlet, and a mix supply container, duct means and operator controlled valve means for controlledly and selectively causing the issue and delivery of either individual product processed in any cylinder as well as the mixed product resulting from the concurrence into one outlet of the individual products processed in two adjacent cylinders, the machine being characterized by the fact that one freezing and supply means in one unit are of volumetric capacity greater than that of the corresponding components of at least one adjacent unit, said one unit being designed for storing, processing and dispensing mix and the frozen edible product which has been actually proved to be principally desired by the costumers, either individually and in its mixture with the product processed by the adjacent unit or units, so that a substantially uniform and balanced service can be obtained from all units in the machine.

According to an important feature of the invention, the several containers of the various units are arranged within an unitary and larger enclosure forming a hollow space about the prevailing area of the side and bottom walls of said several containers, and a liquid mass not freezing at a temperature lower than that at which the mixes are to be held in same containers is maintained and cooled in said hollow space to provide either a heat sink for said mixes and a substantial thermic mass capable to match with and flatten the peaks of refrigeration requirement from the individual containers, as well as to provide a substantial uniform temperature at the several containers walls and in the mixes stored in said containers.

These and other features and advantages of the invention will be made best apparent as this description proceeds, reference being made to the accompanying drawing.

THE FIGURES OF THE DRAWING

FIG. 1 is a perspective and purely diagrammatical illustration of a multiple machine including three dimensionally differentiated units according to the principles of the invention;

FIG. 2 is a similarly diagrammatical perspective view of a gear arrangement adapted for actuating the freezing and processing cylinders of the machine of FIG. 1, and FIG. 3 is a fragmentary and simplified sectional illustration of one cylinder and one supply container of same machine, together with an example of a refrigerating arrangement therefor.

DETAILED DESCRIPTION OF THE PREFERRED EMBODIMENTS

Referring now to FIG. 1, there are shown the essential components and the arrangement in which the present invention is preferably embodied. The several details either of structure and of the various devices and mechanisms, necessary for actually constructing and operating the machine, have not been shown neither will they be described in detail as individually appertaining to the well known art to which this invention appartains.

According to the example shown in FIG. 1, the machine comprises a center cylinder $C_1$ (which might properly termed "main cylinder", as discussed below) supplied by a main supply container $V_1$, and two adjacent side cylinders $C_2$ and $C_3$, individually connected to and supplied by side containers $V_2$ and respectively $V_3$. Each one of the said main and side cylinders includes a motor driven dasher including suitably arranged and helical blades (not shown) therein rotated to whip and move the soft mix towards the front of the machine, wherein the said cylinders have their outlet ends and passages from which the processed ice-cream can be pressurizedly dispensed, upon acting on operator controlled valve means. Such outlet passages are connected, by duct means diagrammatically indicated by dot-and-dash lines in FIG. 1, to at least one outlet, valve and selector device, generally indicated at B and of any well known type, for selective dispensing of ($a$) an edible product as individually prepared and issued by any individual cylinder $C_1$, or $C_2$, or $C_3$, or ($b$) the mixed flavor product resulting from the mixture of products processed in adjacent cylinders $C_1$ and $C_2$, or also ($c$) the other mixed flavor product resulting from the mixture of products processed in adjacent cylinders $C_1$ and $C_3$.

Even assuming that all single and mixed flavors would be equally desired by the public and therefore the dispensed amounts will be statistically equal, the main cylinder $C_1$ will be subject to a work greater than that of the side cylinders, because such main cylinder will provide the product required for forming mixtures with either products of each side cylinder.

Of course, a machine of the type considered is to be either dimensioned and manufactured and operated by applying the experience of a skilled artisan. The operator of the machine knows the average public demand and how such demand is divided among the various flavor and mixtures of flavors. The practical experience teaches that a most desired flavor exists either individually and in mixture with other flavors. Broadly, it has been found that by providing a multiple machine as above outlined, having a main cylinder $C_1$ and a main supply container $V_1$ of inner volume or capacity about twofold that of the corresponding components of the side units, and by operating the main center unit for preparing and dispensing the said most desired flavor, a satisfying balanced service of all units can be ensured. Such balanced service is to be intended in terms of a substantial equality of the time intervals at which a fresh charge of mix is to be poured in the supply containers, and of substantial equality of the time during which the mix is whipped, frozen and caused to stand-by in the cylinder in condition for final dispensing.

Attention is to be paid, in relation with above, that a freezing or processing cylinder is to be suitably dimensioned in view of the foreseen rate of dispensing. A cylinder is considered as overdimensioned when too long stand-by or holding times are experienced, and as underdimensioned when the mix cannot be properly processed while progressively transferred from the cylinder inlet (from its supply) and the valved outlet. Therefore, this invention is not be intended to be bound to specific dimensional values but to comprehend making use of the above concept of volumetrically differentiating the cylinders and the supply containers in a machine designed for selectively dispensing edible frozen or soft-frozen products of different flavors and mixtures thereof, the volumetrical differentiation being calculated on the basis of the experienced average demand.

Such differentiated multi-unit machine is advantageously complemented by a concurrent differentiation of the drive of rotary mix processing means (individually of conventional construction and not forming part of the invention) arranged and operating in the various freezing cylinders. Such differentiation takes into account the difference of diameters of the main and side cylinders and the fact that, according to current art and for simplicity purposes, the said rotary means of all units are preferably actuated by one motor.

The drive arrangement is advantageously provided as shown in FIG. 2 and comprises a center gear $I_1$ and side gears $I_2$ and $I_3$, keyed or otherwise secured to shafts of the said rotary means of the main and respectively of the corresponding side cylinders, the drive being ensured for example by intermeshing idle gears and by a suitable drive transmission (not shown) connected to the motor (not shown).

As well known in the art, each freezing cylinder, or an insulated block wherein all cylinders are unitarily arranged, is refrigerated, generally by circulating refrigerant about them, as by coils secured to their outer walls, such as fragmentarily shown in FIG. 3, where a coil is indicated at 16 and shown about one cylinder indicated at C (since all cylinders are identical as far as their refrigeration is concerned with). The coil (or coils) 16 is connected to a circuit 18 comprised in a conventional refrigerating apparatus including a condenser 20 and a compressor 22 (the return circuits have not been shown, for simplicity, in view of the common knowledge of such refrigerating apparatuses). The temperature of the cylinders can be conventionally sensed by one or more sensor means 24, acting on a control relay R connected to close and open the supply of electrical power to the motor of compressor 22, also as conventional in the art.

As indicated above, the mix stored in any supply container (such as that generally indicated at V in FIG. 3, where the mix is indicated at M) requires refrigeration also and modern ice-cream freezer and dispensers comprise a refrigerating coil secured to, generally by welding, the side walls of the container. Such side walls are preferably made, integrally with the bottom wall of same container, of stainless steel sheeting. Both because the thermal conductivity of stainless steel is poor and because the beat-excharge occurs at localized spots, where the coil is welded to the wall, the refrigeration of the stored mix is generally unsatisfying in the current constructions. For example, if the refrigerant circulating in the coil provides a low difference of temperature between coil and mix, the heat sink is defective. A freshly poured mass M requires an objectionably long time for being cooled, if after such pouring no substantial dispensing of ice-cream is done (with concurrent transfer of a part of the mix in the freezing cylinder). If a powerful refrigerating unit ensures a sharp thermal gradient, the mix portions adjacent to the localizedly cooled walls freezes. Such problems and objections are still more serious if a multi-unit machine according to the invention is to be dealt with, because it comprises different masses of mixes to be cooled.

Therefore, according to the above indicated advantageous feature of the invention, all supply containers $V_1$, $V_2$ and $V_3$ are at least partially arranged and confined into an enclosure 12 forming a hollow space adjacent to the prevailing area of the side and bottom walls of said containers, and wherein a mass 10 of a cooled liquid is enclosed. Such liquid can be for example ethylene glycol or a brine, or other compound, solution or mixture which does not freeze at a temperature below that at which the mix M is to be cooled and maintained (generally few degree above 0°C). The said cooled liquid contacts and uniformly cools the said prevailing area thus ensuring an efficient heat exchange with the mixes, even through rather poorly heat conductive stainless steel walls.

The mass 10 of liquid is therefore a cold mass capable of absorbing a relevant amount of heat and therefore it embodies an effective heat sink. The rate of heat exchange through the walls of the containers is proportional to the difference of temperature at either sides of said walls. Therefore the heat sink is most active with respect to the container V which requires most cooling. If, for example, a fresh charge of mix, say at ambient temperature, is poured into one of the several containers, the heat sink promptly acts for substracting heat therefrom, that is it acts a "reserve of cold", which flattens the peaks of cooling requirement.

The liquid mass M is at its turn cooled by a refrigerant caused to circulate in a coil such as 14. Such coil is spaced from the walls of the container V to prevent localized cooling, and it is preferably thermally connected, such as by welding, to the walls of the enclosure 12 which, as being not in contact with the edible mix M, can be advantageously made of iron, copper, aluminum or other metal or alloy having a high heat transmission coefficient, so that the coil 14 to liquid mass 10 heat transfer occurs essentially at the entire wetted area of the enclosure 12.

The above new arrangement requires therefore a proper refrigerating unit for exhausting heat from the liquid mass 10. The power of such unit is not necessarily so great to meet the peaks of cooling of the mixes, as such peaks are matched by the heat sink embodied by the liquid mass. Therefore, the cooling of the mix M can be ensured by the refrigerating power available from the same refrigerating unit 20, 22 provided for cooling the freezing cylinders C, upon a proper arrangement and circuitry such as not to prejudice the primary requirement of cooling the cylinders.

As diagrammatically shown in FIG. 3, such arrangement might comprise, for example, a sensor 26 which senses the temperature of the container 12, that is of the liquid mass 10. The sensor acts on the relay R, concurrently with the sensor 24, so that a cooling requirement from the liquid 10 can activate the refrigerating apparatus 20, 22, when the primary requirement does not occur. The circuit 18 connected to the cylinder coil 16 is connected through an electrovalve 30, actuated by sensor 24, while the circuit 36 connected to the enclosure coil 14 is connected through another electrovalve 32, the two electrovalve 30 and 32 being at their turn interconnected so that electrovalve 32 cannot open if the electrovalve 30 is open.

Therefore, anytime the sensor 26 senses from the enclosure 12 a temperature of liquid mass 10, such to require cooling (such requirement being not to be immediately met and admitting a substantial delay), and the primary cooling requirement (that of cylinders) is not signalled by sensor 24, the relay R is switched-on and the full refrigerating power available from the refrigerating apparatus 20, 22 is switched to the enclosure coil 14, via the electrovalve 32. If the said primary requirement is on, the cooling of the liquid mass 10 will be discontinued, if occurring and/or delayed until such primary requirement will be met.

In some instances, for example when the machine is operating in hot environments or ambients, a more costant even if small cooling of the liquid mass might be desirable. In view of such occurrence, a further small cross-sectional circuit 38 can be connected to the enclosure coil 14, through a third electrovalve 34 activated by sensor 26 through a timer 40 which acts on said electrovalve at time intervals, upon sensing of cooling requirement by sensor 26, to apply to the enclosure coil 14 a part of the refrigerating power of apparatus 20, 22, while the remaining part of such power is applied to cylinder coil 16, said time intervals and parts being so that the meeting of the primary cylinder cooling requirement would not be dangerously effected.

We claim:

1. A multiunit machine for preparing and dispensing ice cream, comprising at least three individual ice cream preparing and dispensing units for respectively preparing and dispensing ice cream of different flavors, each unit comprising a supply container having a bottom wall and side walls for storage of the mix to be processed, and a freezing and processing cylinder in communication with the respective supply container; operator controlled valve and selector outlet means communicating with said cylinders for selectively dispensing ice cream from any one individual unit or mixed ice cream from one of said units and either of the two other units; an enclosure in which said containers are at least partly confined, said enclosure forming a space defined in part by major portions of the side walls and the bottom wall of said containers, at least part of the walls of said enclosure, not common with the walls of the containers, being made of material having a high heat conductivity; a cooled flowable medium, remaining flowable at a temperature at which the mixes are to be maintained, filling said space in contact with said major wall portion and forming a heat sink for the mixes stored in said containers; a tubular coil in contact with said part of said enclosure walls; a further tubular coil about each freezing and processing cylinder and in contact with the respective cylinder; and means for selectively circulating a cooling medium through said tubular coil of said enclosure and said further tubular coil, said means comprising a pair of sensor means for respectively sensing the temperature of the cooled medium in said space of said enclosure and the temperature of the material in said cylinders, and valve means connected to said sensor means for supplying cooling medium from said cooling medium circulating means to said coil of said enclosure only when the cooling medium supplied to the cooling coils about said cylinders has cooled the interior of said cylinders to a temperature necessary for maintaining the mix therein at a proper temperature.

2. A machine as defined in claim 1, wherein said container walls are formed from stainless steel, and wherein said part of said enclosure walls is formed from metal having a considerably higher coefficient of heat conductivity than stainless steel.

3. A machine as defined in claim 1,
wherein the supply container and the freezing cylinder of said one unit have a substantially greater volume than that of the supply container and the cylinder of the other two units.

* * * * *